United States Patent [19]
Mossman

[11] Patent Number: 6,165,076
[45] Date of Patent: Dec. 26, 2000

[54] DRIVE SHAFT COVER ASSEMBLY

[75] Inventor: Michael Wayne Mossman, Silvis, Ill.

[73] Assignee: Deere & Company, Moline, Ill.

[21] Appl. No.: 09/287,519

[22] Filed: Apr. 7, 1999

[51] Int. Cl.$^7$ .................... F16P 1/00; B25G 3/12
[52] U.S. Cl. .................. 464/175; 464/901; 74/609; 24/23 R; 24/457; 277/636; 403/327
[58] Field of Search ..................... 464/901, 185, 464/175, 173, 170; 903/315, 316, 317, 326, 327, 329; 277/636; 24/23 R, 457, 458, 459; 74/609

[56] References Cited

U.S. PATENT DOCUMENTS

| 859,233 | 7/1907 | Lane | 403/329 |
|---|---|---|---|
| 2,772,550 | 12/1956 | Harrington | 464/170 |
| 3,866,440 | 2/1975 | Stananought | 464/175 |
| 4,308,931 | 1/1982 | Khanna | 74/609 |
| 4,568,313 | 2/1986 | Diffenderfer et al. | 74/609 |
| 4,711,595 | 12/1987 | Magid et al. | 403/329 |
| 5,026,323 | 6/1991 | Fukumura et al. | 464/175 |
| 5,364,310 | 11/1994 | Taylor | 464/170 |
| 5,961,388 | 10/1999 | Breidenbach et al. | 464/175 |

*Primary Examiner*—Lynne H. Browne
*Assistant Examiner*—Kenneth Thompson

[57] ABSTRACT

A drive shaft cover assembly for a drive shaft having a longitudinal axis including a stationary bracket having an axially extending flange at least partially surrounding the drive shaft and having one or more radially extending apertures therethrough. A cover member has a retaining portion sized to fit radially over the flange with apertures therein aligned with the apertures in the flange. A spring retainer is disposed radially within the flange and has a stud projecting radially outward through each aperture in the flange and through the aligned apertures in the cover member to retain the cover member on the flange. The spring retainer is resilient to enable the studs to be pushed radially inward to withdraw the studs from the apertures in the cover member to remove and remount the cover member on the flange without the use of hand tools.

13 Claims, 2 Drawing Sheets

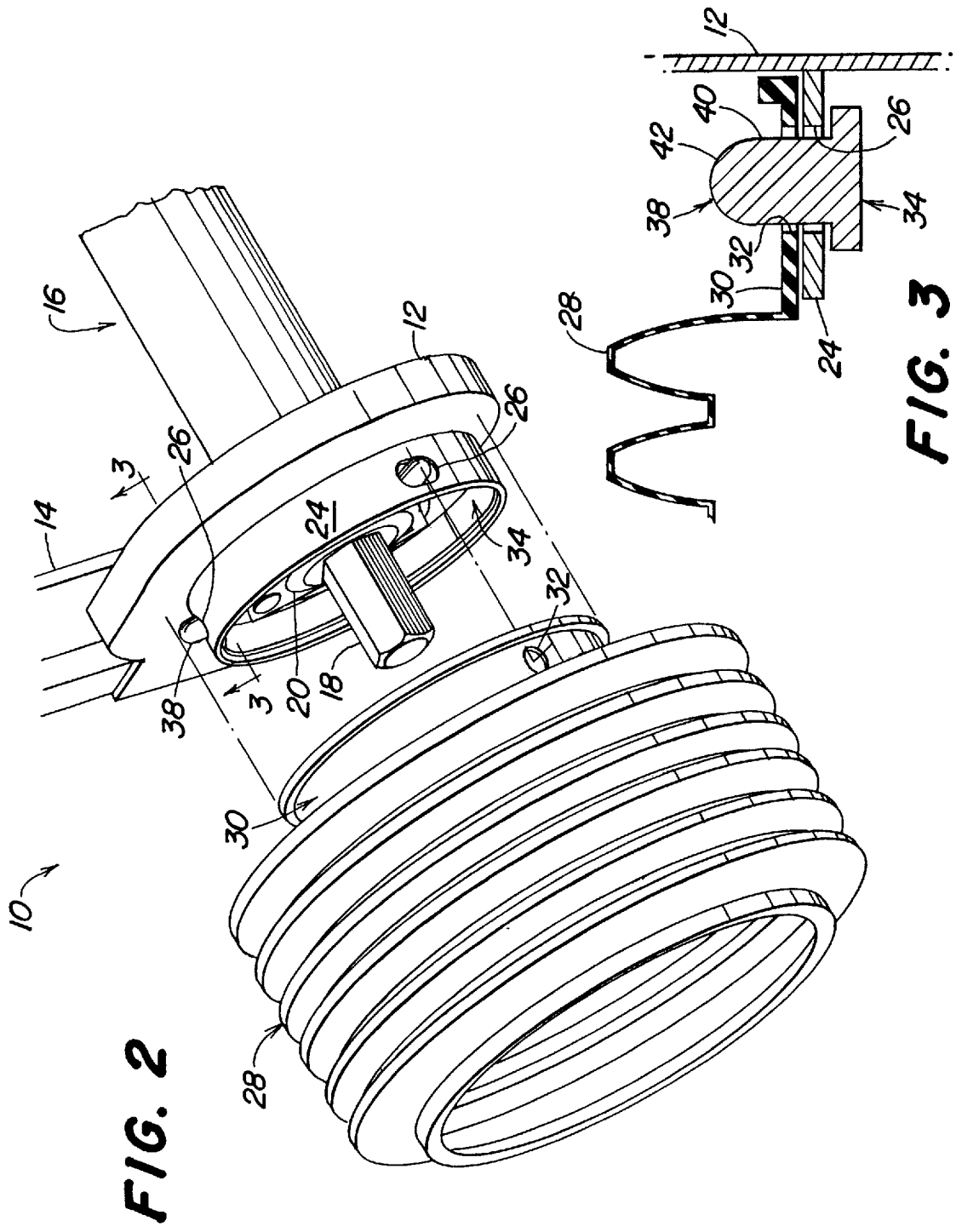

DRIVE SHAFT COVER ASSEMBLY

BACKGROUND OF THE INVENTION

1. Field of the Invention

The present invention relates to a drive shaft cover assembly and in particular to a retaining ring that mounts a cover member surrounding a portion of a drive shaft and enables the cover member to be manually removed and remounted without the need for hand tools.

2. Description of the Prior Art

It is common practice to provide a cover member around a rotating drive shaft, particularly around a universal joint or coupling at the end of a drive shaft.

Metal plates have been used to cover a drive shaft end. Some plates are permanently mounted in place while others are rotatably mounted to pivot to an open position to access the universal joint and/or coupling. Metal covers are relatively expensive and add weight, which may not be desirable.

As a means of reducing weight and cost, flexible cover members made of molded plastic have been used in place of metal covers. Flexible cover members are attached to a fixed mounting structure adjacent the drive shaft by nut and bolt fasteners, hose clamps, various types of plastic clips, etc. These fasteners often require the use of tools when removing the cover member to access the universal joint and/or coupling.

SUMMARY OF THE INVENTION

It is an object of the present invention to provide a retaining mechanism for a flexible cover member that enables the cover member to be removed and remounted without the use of hand tools.

It is an advantage of the present invention that the user of the equipment containing the drive shaft can easily remove and remount the cover member without the need for hand tools that may not be readily available.

The present invention provides a drive shaft cover assembly that includes a stationary bracket adjacent to the drive shaft. The bracket has an axially extending flange that at least partially surrounds the drive shaft. The flange has one or more radially extending apertures therethrough. The cover member has a retaining portion that is sized to fit radially over the flange and has apertures that align with the apertures in the flange. A spring retainer is disposed radially within the flange and has a stud projecting radially outward through each of the apertures in the flange and the aligned apertures in the cover member to retain the cover member on the flange. The spring retainer is resilient to enable the studs to be pushed radially inward, withdrawing the studs from the apertures in the cover member to remove the cover member from the flange. The cover member is mounted on the flange in a similar manner by pushing the studs radially inward and positioning the cover member over the flange. The spring retainer is flexible to enable the studs to be pushed radially inward by hand manipulation.

In a preferred embodiment of the invention, the flange completely surrounds the drive shaft and is circular. The spring retainer is circular as well and formed of a flexible band that deflects to withdraw the studs radially inward.

BRIEF DESCRIPTION OF THE DRAWINGS

FIG. 2 is a perspective view of the drive shaft cover assembly of the present invention with only the cover member itself shown removed; and FIG. 3 is a cross section view of the cover assembly of the present invention as seen from substantially the line 3—3 of FIG. 2 with the cover member mounted.

DETAILED DESCRIPTION OF THE PREFERRED EMBODIMENT

Figure 1:
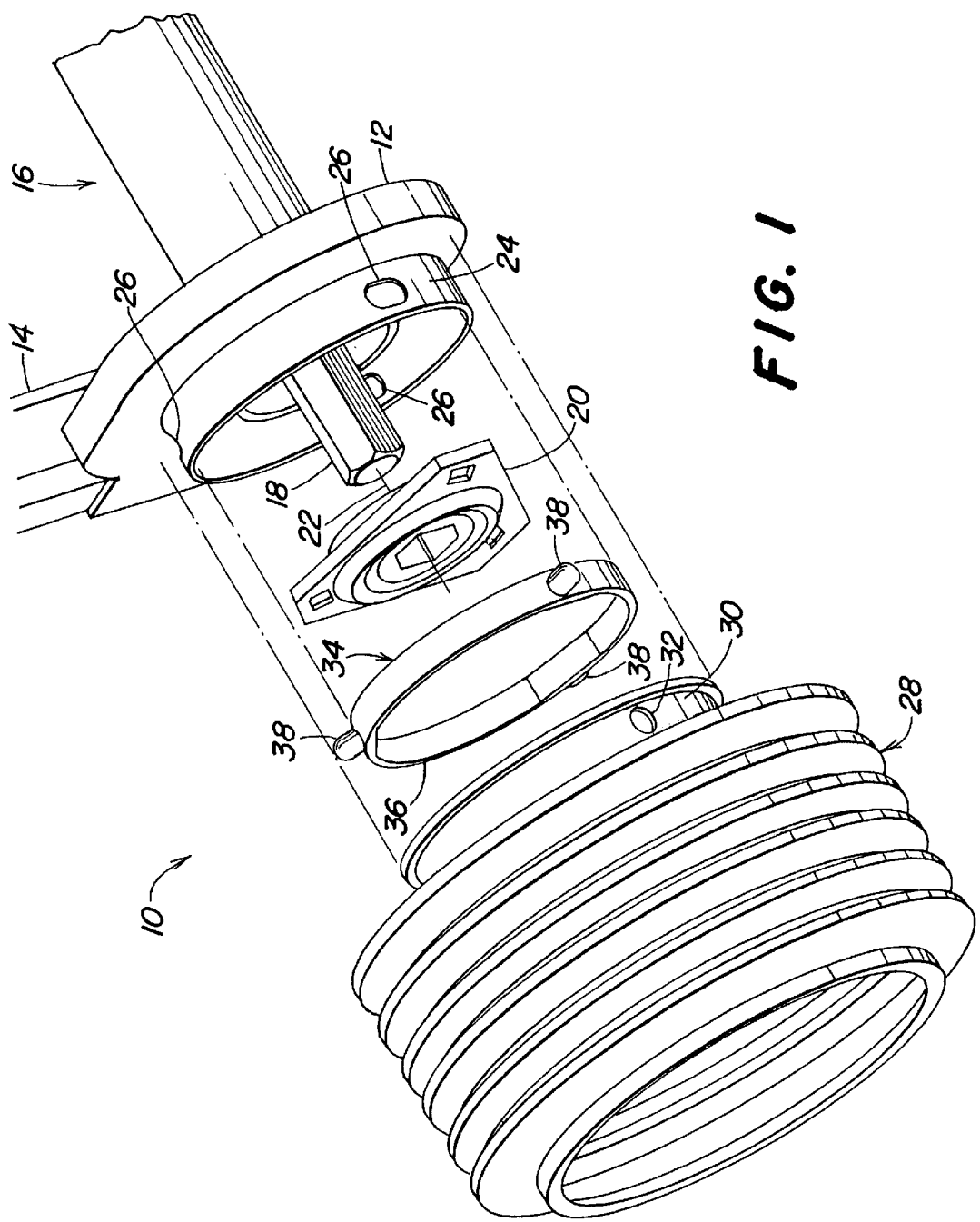
FIG. 1 is an exploded perspective view of the drive shaft cover assembly of the present invention.

The drive shaft cover assembly of the present invention is shown in FIG. 1 and designated generally at 10. The cover assembly includes a bracket 12 fixed to the supporting structure 14 of the equipment containing the drive shaft. A drive shaft 16 has an end portion 18 that is supported in the bracket 12 by a bearing assembly 20. The drive shaft 16 has a longitudinal axis 22.

The bracket includes a flange 24 that extends in the axial direction and is shown in FIG. 1 surrounding the drive shaft 16. The flange 24 has a plurality of apertures 26 extending radially therethrough. In the embodiment illustrated, there are three apertures 26 in the flange 24 equally spaced around the flange.

A cover member 28 has an annular retaining portion 30 sized to fit radially over the flange 24. The retaining portion has a plurality of apertures 32 equal in number to the apertures 26 in the flange that align with the apertures 26 when the retaining portion 30 of the cover member 28 is placed radially over the flange 24.

A spring retainer 34 retains the cover member 28 on the flange 24. The spring retainer has a band 36 sized to fit radially within the flange 24. A plurality of studs 38 project radially outward from the band 36 through the apertures 26 in the flange 24 and through the aligned apertures 32 in the cover member 28. The studs 38 retain the cover member 28 in place upon the flange 24. The studs 38 preferably have a cylindrical portion 40 and terminate with a semi-spherical distal end 42. The rounded stud ends aid in removing and remounting the cover, however, other shapes may be used for the studs.

The apertures 26 in the flange 24 are oblong to provide some play in the assembly. The apertures 26 can be made circular if desired.

The spring retainer 34 can be made of a variety of materials such as spring steel or plastic. In a preferred embodiment, the retainer is injection molded as a one-piece plastic body of a thermoplastic polymer compound including, but not limited to, nylon, acetal polyester, polypropylene, polyurethane or other similar material. The band 36 is flexible to enable the studs 38 to be pushed radially inward to withdraw the studs from the apertures 32 in the cover member 28. This enables the cover member to be removed from the flange 24 to access the end portion 18 of the shaft. Such access is necessary to couple and uncouple an additional drive shaft to the end portion 18 of the drive shaft 16. Access to the shaft end portion without the use of hand tools to manipulate fasteners for the cover member is a convenience to the equipment user.

The invention can have embodiments other than what is illustrated herein. For example, individual spring retainers, each with a single stud, can be provided for each aperture in the flange 24. In such an embodiment, each spring retainer must be secured to the inside of the flange 24. With the use of multiple spring retainers secured to the flange, the flange can be formed of multiple, spaced, portions rather than a continuous ring surrounding the drive shaft. Furthermore, the flange, the cover member retaining portion and the spring retainer need not be circular, but can have any desired shape. Accordingly, the invention should not be limited to the above-described embodiment, but should be limited solely to the claims that follow.

What is claimed is:

1. A drive shaft cover assembly for a drive shaft having a longitudinal axis, the assembly comprising:

a stationary bracket having an axially extending flange surrounding the drive shaft, the flange having a plurality of radially extending apertures therethrough;

a cover member having a retaining portion sized to fit radially over the flange and having a plurality of apertures therein aligned with the apertures in the flange; and a spring retainer disposed radially within the flange and having a flexible band surrounding the drive shaft, the spring retainer having studs projecting radially outward through the apertures in the flange and the aligned apertures in the cover member to retain the cover member on the flange, the band being flexible to enable the studs to be pushed radially inward to withdraw the studs from the apertures in the cover member to remove the cover member from the flange and to remount the cover member on the flange without the use of hand tools.

2. The drive shaft cover assembly as defined by claim 1 wherein the flange, the cover member retaining portion and the spring retainer are generally circular.

3. The drive shaft cover assembly as defined by claim 1 wherein the flange and the cover member have three apertures therein and the spring retainer has three studs projecting radially outward through the apertures.

4. The drive shaft cover assembly as defined by claim 1 wherein the spring retainer is a one piece injection molded plastic body.

5. The drive shaft cover assembly as defined by claim wherein the spring retainer is a one piece body of a thermoplastic polymer compound.

6. A drive shaft cover assembly for a drive shaft, the cover assembly comprising:

a drive shaft having an end and a longitudinal axis;

a stationary support bracket adjacent the drive shaft end for supporting the drive shaft, the support bracket having an axially extending flange at least partially surrounding the drive shaft, the flange having at least one radially extending aperture therethrough;

a cover member having a retaining portion sized to fit radially over the flange and having at least one aperture therein aligned with the at least one aperture in the flange; and a spring retainer disposed radially within the flange, the retainer having a stud projecting radially outward through an aperture in the flange and through the aligned aperture in the cover member to retain the cover member on the flange, the spring retainer being resilient to enable the stud to be pushed radially inward to withdraw the stud from the aperture in the cover member to remove the cover member from the flange and to remount the cover member on the flange without the use of hand tools.

7. The drive shaft cover assembly as defined by claim 6 wherein the flange and the cover member retaining portion surround the drive shaft.

8. The drive shaft cover assembly as defined by claim 6 wherein the flange, the cover member retaining portion and the spring retainer are generally circular and surround the drive shaft.

9. The drive shaft cover assembly as defined by claim 8 wherein the spring retainer has a flexible band sized to fit within the flange with the studs projecting radially outward through the apertures, the band being flexible to enable the studs to be pushed radially inward through the apertures in the cover member retaining portion to mount and remove the cover member.

10. The drive shaft cover assembly as defined by claim 9 wherein the spring retainer is a one piece injection molded plastic body.

11. The drive shaft cover assembly as defined by claim 9 wherein the spring retainer is a one-piece body of a thermoplastic polymer compound.

12. The drive shaft cover assembly as defined by claim 6 further comprising a bearing assembly mounted to the bracket for rotatably supporting the drive shaft end portion in the bracket.

13. The drive shaft cover assembly as defined by claim 6 wherein the flange and the cover member have three apertures therein and the spring retainer has three studs projecting radially outward through the apertures.

* * * * *

UNITED STATES PATENT AND TRADEMARK OFFICE
CERTIFICATE OF CORRECTION

PATENT NO. : 6,165,076　　　　　　　　　　　　　　　　　　Page 1 of 1
DATED       : December 26, 2000
INVENTOR(S) : Michael Wayne Mossman It is certified that error appears in the above-identified patent and that said Letters Patent is hereby corrected as shown below:

<u>Column 3,</u>
Line 36, after "claim", insert -- 1 --

Signed and Sealed this

Eleventh Day of December, 2001

*Attest:*

*Attesting Officer*　　　　NICHOLAS P. GODICI
　　　　　　　　　　*Acting Director of the United States Patent and Trademark Office*